United States Patent [19]
Haase

[11] Patent Number: 4,609,248
[45] Date of Patent: Sep. 2, 1986

[54] CORD AND END FITTING PROTECTOR

[76] Inventor: Gerald A. Haase, 1005 Country Club Rd., Lake Oswego, Oreg. 97034

[21] Appl. No.: 646,936

[22] Filed: Sep. 4, 1984

[51] Int. Cl.⁴ ..................... H01R 13/56; H01R 13/58
[52] U.S. Cl. .................................................. 339/103 R
[58] Field of Search ........... 339/101, 103, 106, 119 C, 339/5 RL, 6 RL, 8 RL, 75 P

[56] References Cited
U.S. PATENT DOCUMENTS

| | | | |
|---|---|---|---|
| 1,977,224 | 10/1934 | Albertson | 339/106 X |
| 2,225,031 | 12/1940 | Caldwell | 339/106 X |
| 2,913,791 | 11/1959 | Martin | 339/119 C |

*Primary Examiner*—Eugene F. Desmond
*Attorney, Agent, or Firm*—Olson and Olson

[57] ABSTRACT

A cord and end fitting protector comprises a sleeve member configured to overlie the outer sheathing of an electrical cord or outer surface of other forms of cord and be crimped into tight frictional engagement thereon inwardly from the terminal end of the cord. The sleeve mounts an inwardly extending, substantially hollow enlarged sleeve member configured to encircle a further inward portion of the cord, for the purpose of providing an easily graspable member by which the cord may be pulled; for limiting the degree of arcuate bending of the cord to a desired maximum; and for providing an abutting stop which may receive impact and transmit the same to the outer sheathing of the cord in cases in which the cord is associated with an automatic rewind mechanism and the cord is inadvertently allowed to be uncontrollably rewound by the mechanism.

8 Claims, 11 Drawing Figures

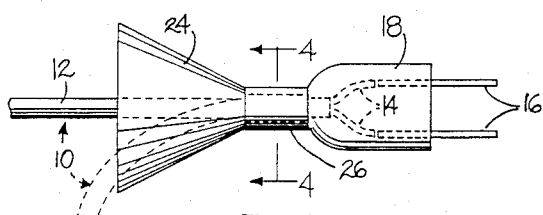
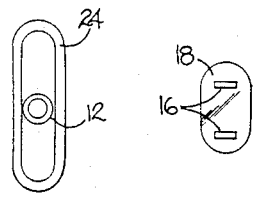
Fig. 1  Fig. 2  Fig. 3
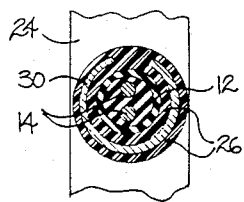
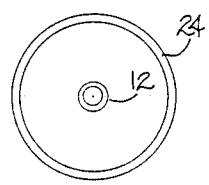
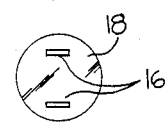
Fig. 4  Fig. 5  Fig. 6
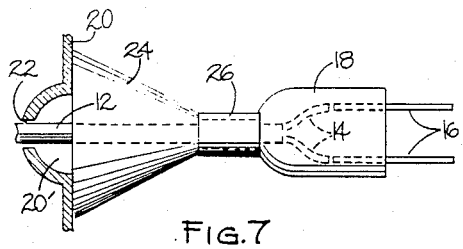
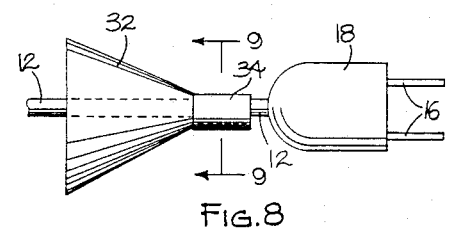
Fig. 7  Fig. 8
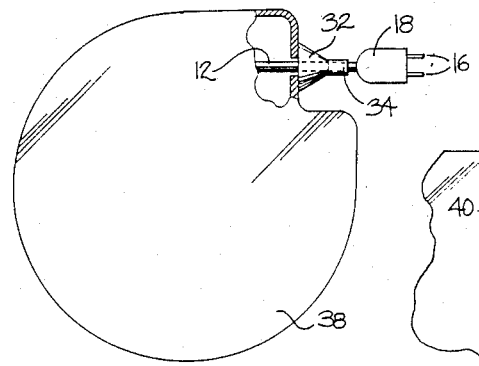
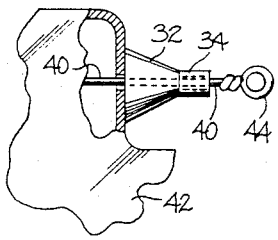
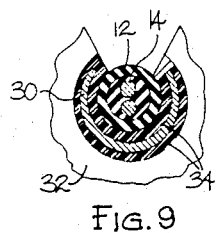
Fig. 10  Fig. 11  Fig. 9

CORD AND END FITTING PROTECTOR

BACKGROUND OF THE INVENTION

This invention relates to electrical cords and their connection to wall plug type fittings, and more particularly to a stop device arranged for attachment to the outer sheathing of a cord associated with a cord recoil mechanism for the purpose of preventing the electrical plug or other fitting on the end of the cord from being disconnected from the cord by impact with the housing of the recoil mechanism upon full retraction of the cord by the recoil mechanism.

Automatic cord recoil mechanisms are well known in the art, and vacuum cleaners and utility lights are typical examples of articles which utilize spring loaded rewinding mechanisms to conveniently store the electrical cord when not in use. A slight tug on the cord unlocks a spring tensioned drum which collects the electrical cord as it rotates within an enclosure housing.

It is extremely common that electrical devices employing such rewinding mechanism suffer from the inherent problem of the electrical wall plugs on the end of the cord being pulled free of the cord by the hard impact of the plug contacting the housing after the rewinding mechanism has fully rewound all of the cord. Heretofore, the plug typically provides the stopping abutment which prevents any further winding of the apparatus. In the case of the utility light, clothes line or other cord devices having an automatic rewind apparatus, the particular fitting at the end of the cord abuts the rewind housing, and all such fittings tend to suffer similarly under the impacts of repeated use.

Plug protectors addressing the problems associated with the inadvertent separation of the plug from its cord have been provided heretofore. However, they relate strictly to contructions involving specialized electrical plugs arranged to engage an electrical cord or its conductor wires in a manner which prevents separation of the wires from the terminals when pulling the plug out a wall socket by pulling on the electrical cord itself. U.S. Pat. Nos. 2,054,612, 1,276,216, 2,716,741, 2,774,948, 2,913,791, and 1,804,474 illustrate various ways of securing a plug to an electrical cord. No reference has been found, however, which contemplates the provision of a stop which is easily attachable to the outer sheathing of a cord for absorbing the impact associated with stopping an automatic cord rewind mechanism rather than allowing the plug to be subjected to such impacts.

Additionally, no reference has been found which provides a device, attachable to a cord or a plug, arranged to limit the degree of bending permitted the cord relative to its engagement to a plug or similar fitting. Particularly with electrical cords, when the cord is forced into sharp bends at its juncture with the electrical plug, the conductor wires are subjected to bending and premature breaking.

SUMMARY OF THE INVENTION

In its basic concept, this invention provides an attachment to a cord inwardly from an associated fitting on the terminal end of the cord, the attachment secured to the outside surface of the cord to provide a stop abutment configured to prevent contact of the fitting with the housing of an automatic recoil mechanism associated with the cord for the purpose of absorbing the shock and tension otherwise applied against the fitting.

It is by virtue of the foregoing basic concept that the principal objective of this invention is achieved; namely, the provision of a cord protector arranged to prevent a fitting at the end of a cord from impacting the housing of an automatic cord rewind mechanism and thereby being damaged or torn loose from the cord.

Another important object of this invention is the provision of a cord protector of the class described which additionally provides an easily graspable attachment to a conventional cord for pulling on the cord without pulling on the conventional fitting associated with the end of the cord.

Another object of this invention is the provision of a cord protector of the class described which, when attached to an electrical cord adjacent the conventional plug fitting thereof, prevents any bending of the cord immediately adjacent the fitting and further limits the degree of bending permitted the cord immediately adjacent the protector for the purpose of preventing excessive wear and breakage of the electrical conductors of the cord.

Another object of this invention is the provision of a cord protector of the class described which may be formed integrally with a cord and fitting, or may be configured as an easily anchorable attachment to a cord inwardly of an existing fitting thereof.

A further object of this invention is the provision of a cord protector of the class described which is of simplified construction for economical manufacture and installation.

The foregoing and other objects and advantages of this invention will appear from the following detailed description, taken in connection with the accompanying drawings of preferred embodiments.

BRIEF DESCRIPTION OF THE DRAWINGS

FIG. 1 is a fragmentary plan view of one end of an electrical cord mounting a wall plug fitting integrally formed with a cord protector embodying the features of this invention, the protector of this embodiment also illustrating a construction which provides for the limiting of bending permitted a cord to a desired, predetermined maximum, as shown in broken lines.

FIG. 2 is an end view from the left in FIG. 1 showing the open end of the cord protector as having a substantially rectangular configuration.

FIG. 3 is an end view from the right in FIG. 1 showing the typical wall plug fitting as having a substantially rectangular configuration.

FIG. 4 is an enlarged transverse sectional view of the protector of FIG. 1, taken along the line 4—4 in FIG. 1.

FIG. 5 is an end view, similar to FIG. 2, of the open end of a cord protector of this invention having a substantially circular configuration.

FIG. 6 is an end view, similar to FIG. 3, of a typical wall plug fitting having a substantially circular configuration for complementary association with the cord protector of FIG. 5..

FIG. 7 is a fragmentary plan view of the protector of FIG. 1, shown in abutting condition with the housing of a cord recoil mechanism, as when the cord is fully rewound.

FIG. 8 is a fragmentary plan view of another embodiment of a cord protector attachment arranged for clamping on an electrical cord inwardly of an existing cord wall plug fitting.

FIG. 9 is an enlarged transverse section of the protector embodied in FIG. 8, taken along the line 9—9 in FIG. 8.

FIG. 10 is a plan view of the protector in FIG. 8 shown in abutting condition with the housing of a typical electrical cord recoil mechanism.

FIG. 11 is a fragmentary side view of a cord protector of this invention on another type of cord such as a clothes line associated with an automatic recoil mechanism.

DESCRIPTION OF THE PREFERRED EMBODIMENT

FIGS. 1-7 illustrate one embodiment of the cord protector of this invention configured integrally with a conventional electrical wall plug associated with the power cord of an appliance having an automatic rewinding mechanism, such as that of an extension cord of a vacuum cleaner or other electrical device. In the embodiment illustrated, an electrical power cord 10 has an outer innsulating sheathing 12 carrying therein a pair of electric conductor wires 14 terminating in typical male wall plug prongs 16.

Modern wall plugs encase the wires 14 and part of the prongs 16, (and their respective connections to the wires), in an insulating plastic or rubber plug member 18 arranged for grasping when connecting and disconnecting the plug from a wall socket (not shown). The terminal end of the wires and the terminal ends of the outer cord sheath 12 therefore is usually received within the plug member 18 as shown, and thus ordinarily completes the bond between the electric cord and its associated wall plug.

It is common practice to disconnect a cord plug from a wall socket for a person to grasp a convenient portion of the electric cord and jerk on it, wrenching the plug from its wall socket, and then to release hold on the cord, allowing a spring driven rewind mechanism to withdraw the cord rapidly. When the cord has been fully retracted into the housing 20 of a rewind mechanism through opening 22, the plug member 18 is brought into abutment with the housing very forcefully. This stops continued winding since the plug cannot pass through the small cord opening 22. Repeated impact of the plug member 18 with the housing 20 frequently results in tearing loose the wire connections from the prongs 16. Eeventually the plug member may be severed from the power cord. Repair involves disassembly of the appliance in order to retrieve the cord from the interior of the housing and replacement of the plug member 18.

In the embodiment of FIGS. 1-7, a protective, cord encircling stop member 24 is joined integrally with a replacement plug member 18 through an interconnecting hollow, tubular sleeve section 26. The electric cord 10 passes through the hollow interior of the stop member 24 and sleeve section 26, as shown.

Clamping means is provided to secure the section 26 positively to the cord 10. FIG. 4 shows that the hollow tubular sleeve section 26 encases a split metal crimping ring 30. For use with electrical cords the sleeve section is made of electrically non-conductive material, such as resilient synthetic thermoplastic resin to isolate the metal crimping ring electrically from accidental contact with the conductor wires 14.

When the electric conductor wires 14 are connected to their respective prongs 16, and the sheath 12 contained within the tubular section 26, the latter may be squeezed by a pliers or other suitable tool to crimp the ring 30 and thus draw the sleeve section 26 into tight engagement about the outer sheathing 12. Accordingly, both the plug 18 and its integral protector assembly 24, 26 are secured rigidly to the extension cord 10 utilizing the outer sheathing 12 of the latter. Therefore, any tension applied against either the plug 18 or the protector 24 is applied to the outer sheathing 12 of the cord, and not to the wires 14 themselves or their connections to the prongs 16.

FIG. 1 also illustrates that the hollow protector member 24 prevents the cord 10 from being bent beyond a predetermined maximum degree relative to its connection to the plug member 18. The hollow protector member requires the cord to form an enlarged radius which prevents the bending of the cord into sharp angles at the normally vulnerable juncture of the cord with the plug member 18. Various sizes and configurations of the protector, of course, provide different bending limitations permitted the cord as may be desired.

FIGS. 2 and 5 are illustrative of two alternative protector configurations; the protector 24 of FIG. 2 being of substantially rectangular configuration to complement the rectangular shape of the plug 18 in FIG. 3, and the protector 24 of FIG. 5 being of substantially circular configuration to complement the circular configuration of the plug 18 of FIG. 6. Both plug configurations are conventional and available in the marketplace.

Since the protector member 24 is, in the embodiment of FIGS. 1-7, attached integrally to the plug 18 itself, the enlarged protector also provides for a secure and convenient handle by which a person may pull the plug 18 from a wall socket. No damaging tension is applied against the electrical connection of the individual wires 14 of the cord to the prongs 16 because of the crimped attachment of the section 26 to the outer sheath surface 12 of the extension cord. Also, since the plug 18 is attached, through the sleeve 26, directly to the cord sheathing 12, jerking on the cord itself will not place any strain on the wires 14 or their connection to the terminals 16.

FIG. 7 illustrates the protector embodied in FIGS. 1-6 in abutting, stopping engagement with the housing 20 of a typical rewind apparatus. The protector body 24 is preferably configured to be larger than its associated plug 18 in order to provide proper positive contact with the housing 20 and to not become jammed into the plug well 20' configured and dimensioned to receive the original plug of the cord.

FIGS. 8, 9 and 10 illustrate another embodiment of a cord protector arranged for attachment to an extension cord or the like without requiring the removal or replacement of the existing plug member 18 or other fitting. In this embodiment, the protector 32 is again essentially conical in profile, (although not limited thereto), and includes a tubular clamping section 34 encasing crimping ring 36, similar to the assembly 26 and 30 described previously. However, as shown in the sectional view of FIG. 9, both the protector member 32 and the clamping section 34 are formed with an open peripheral portion on a common side surface so that an intermediate portion of the resilient cord 10 may be pressed through it. The crimping ring 30 associated with tubular section 34 is squeezed, as by pliers, to frictionally engage the section 34 with the cord disposed therein, in the same manner as previously described. The protector 32 thus rigidly attached functions as a rewind stop member in the manner of the protector 24 described earlier.

Since no physical connection is made between the protector 32 and the plug 18 itself, however, it is understood that pulling on the enlarged protector member 32 attached to the cord 10 to disconnect the plug 18 from a wall socket is not advised, as the plug is not secured to the sheath as in FIG. 1.

If desired, the protector embodied in FIGS. 8, 9 and 10 can be disposed so that the tubular section 34 abuts the plug 18, thereby preventing any bending at the juncture of the cord with the plug. Thus, cord bending would be governed by the limits provided by the protector itself, as has already been described in connection with FIG. 1.

FIG. 10 shows the protector of FIG. 8 in operational, abutting condition with the housing 38 of a cord rewind apparatus, such as a power extension cord pack or the like.

FIG. 11 illustrates the versatility of the anticipated usage of the protector of this invention by placing the protector of FIG. 8 onto an ordinary, non-electrical cord 40. In this example, in which the cord 40 may be a clothesline carried in the housing 42 of an automatic rewind mechanism, the protector 32 is attached to the cord 40 inwardly of a conventional fitting, such as the eyelet hook 44 shown, in the same manner as has been described in connection with FIG. 8.

The protectors illustrated in the drawings, by virtue of their direct attachment to the outer surface of a cord, may be grasped and pulled against when pulling the cord to withdraw the latter from the rewind mechanism. This avoids the necessity of pulling on the fittings 18 or 44 themselves, and subjecting them to undue strain.

Also, in rewinding the cord it is likely that a firm hold on the cord might occasionally be lost, whereupon the rewind mechanism would operate to rewind the cord uncontrollably. The protectors embodied herein all serve to provide an abutting stop member disposed inwardly of the cord fitting, which prevents damage to the fitting and any component thereof by preventing the fitting from engaging the rewind housing directly. All strain of such impact is therefore placed on the tough outer sheathing or other surface of the cord itself.

Finally, each of the protectors embodied herein serve the additional function, by virtue of their unique construction, of restricting cord bending to a particular angular maximum. Thus, cord damage due to forceful or continued sharp bending at the juncture of the cord with its respective terminal fitting is completely eliminated.

From the foregoing it will be apparent to those skilled in the art that various changes other than those already described may be made in the size, shape, type, number and arrangement of parts described herein without departing from the spirit of this invention and the scope of the appended claims.

Having thus described my invention and the manner in which it may be used, I claim:

1. For attachment to a cord having a fitting on one end, a cord and fitting protector comprising:
   (a) clamp means configured to overlie and engage a portion of the length of a cord adjacent the fitting end thereof, for frictionally engaging the outer surface of a cord and firmly securing the clamp means in fixed position on the outer surface of the cord, and
   (b) an enlarged, hollow protector member secured to said clamp means and extending outwardly away from said clamp means to a dimension at least about twice the corresponding dimension of the clamp means and arranged to encircle a portion of a cord inwardly of a fitting on the end thereof.

2. The cord protector of claim 1 wherein the clamp means includes a sleeve member configured to substantially encircle a cord, and a clamp member on the sleeve member is arranged to secure the sleeve member to the cord.

3. The cord protector of claim 2 wherein the sleeve member is of resilient material and the clamp member is a split crimping ring encased in the sleeve member.

4. The cord protector of claim 2 for attachment to an electrical cord, wherein the sleeve member is of electrically non-conductive resilient material and the clamp member is a split metal ring encased in the sleeve member.

5. The cord protector of claim 1 wherein said enlarged protector member is substantially hollow and extends axially from the end of the clamp means facing opposite the end fitting on a cord for limiting the degree of bending of the cord extending from the sleeve member.

6. The cord protector of claim 1 for attachment to a cord which is connected to a conventional automatic cord rewind apparatus, wherein said enlarged protector member is arranged to be disposed on the cord at a position inwardly from the outer terminal end thereof, the enlarged protector member being configured to provide an abutment stop arranged to engage the rewind apparatus when the cord is wound into the apparatus to prevent the end fitting of the cord from engaging the rewind apparatus.

7. The cord protector of claim 1 for attachment to an electrical cord having an outer insulating sheathing encasing electrical wires, wherein the clamp means further mounts, on its end opposite said enlarged protector member, an electrical plug fitting to which said electrical wires are conventionally attached, and the clamp means is arranged to engage the outer sheathing of the electrical cord for securing the assembly to the cord sheathing and preventing movement of the cord and its associated wires relative to said electrical plug fitting.

8. For attachment to a cord having a fitting on one end, a cord and fitting protector comprising:
   (a) clamp means configured to overlie and engage a portion of the length of a cord adjacent the fitting end thereof, for frictionally engaging the outer surface of a cord and firmly securing the clamp means in fixed position on the outer surface of the cord, and
   (b) an enlarged protector member secured to said clamp means and arranged to encircle a portion of a cord inwardly of a fitting on the end thereof,
   (c) the clamp means and the enlarged protector member including open peripheral portions on one side configured to receive a cord therethrough to allow installation of the members directly onto an intermediate portion of a cord.

* * * * *